3 Sheets--Sheet 1.

J. EDSON.
Street-Sweeping Machine.

No. 159,025.   Patented Jan. 26, 1875.

Witnesses:
John R. Heard
Francis Allen

Inventor
Jacob Edson
by Alban Andrén
his attorney

J. EDSON.
Street-Sweeping Machine.
No. 159,025. Patented Jan. 26, 1875.
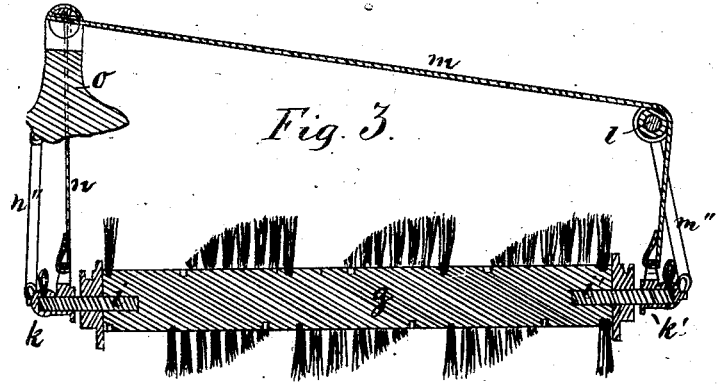
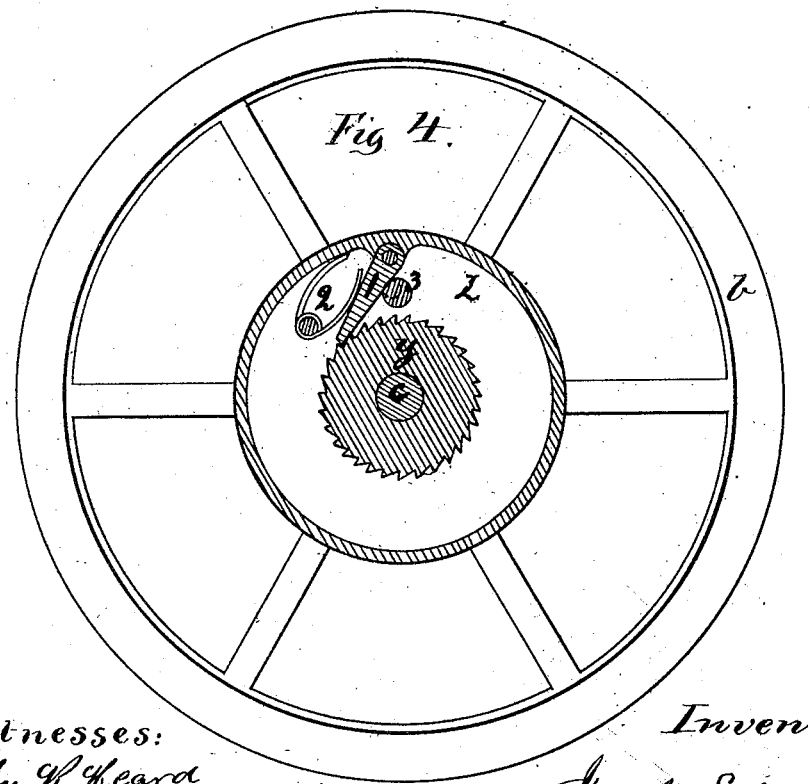
Witnesses:
John H. Heard
Francis Allen
Inventor:
Jacob Edson
by Alban Andrén
his atty 3 Sheets--Sheet 3.

J. EDSON.
Street-Sweeping Machine.

No. 159,025.

Patented Jan. 26, 1875

Witnesses:
John R. Heard
Francis Allen

Inventor.
Jacob Edson
by Alvan Andrew
his attorney.

UNITED STATES PATENT OFFICE.

JACOB EDSON, OF BOSTON, MASSACHUSETTS.

IMPROVEMENT IN STREET-SWEEPING MACHINES.

Specification forming part of Letters Patent No. 159,025, dated January 26, 1875; application filed December, 1874.

*To all whom it may concern:*

Be it known that I, JACOB EDSON, of Boston, in the county of Suffolk and State of Massachusetts, have invented certain new and useful Improvements in Street-Sweeping Machines; and I do hereby declare that the following is a full, clear, and exact description thereof, which will enable others skilled in the art to which it pertains to make and use the same, reference being had to the accompanying drawings and to the letters of reference marked thereon, which form a part of this specification.

My invention relates to improvements in street-sweeping machines; and consists in an improved construction of the frame and stays by which the rotary brush is supported; also, in an improved lifting and holding device for the brush; also, in an improvement in the manner of attaching and detaching the driving-wheels to and from the driving-shaft; also, in the employment of an adjustable independent dust-guard, that is adjustable independent of the rotary brush.

Figure 2:
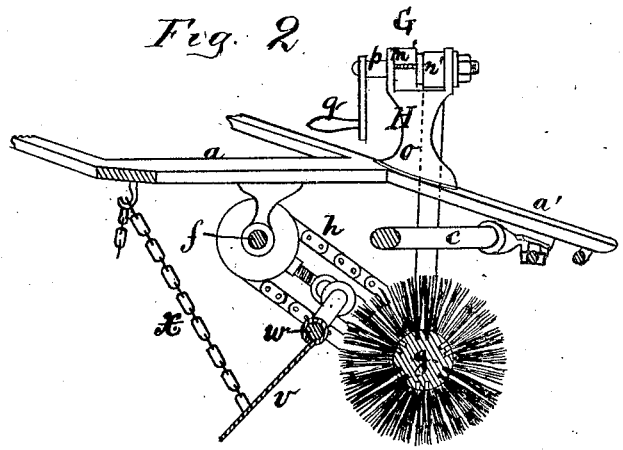
Figure 1:
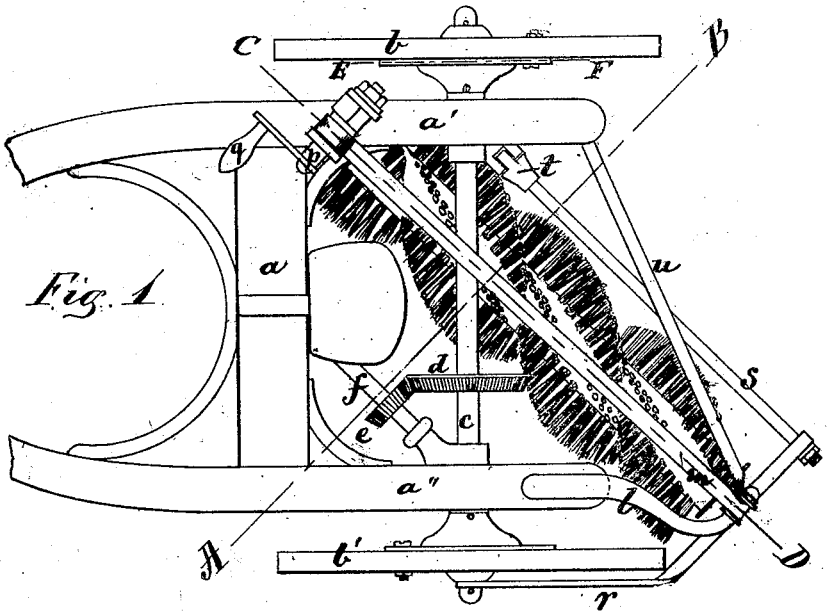
Figure 5:
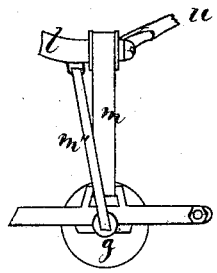
Figure 6:
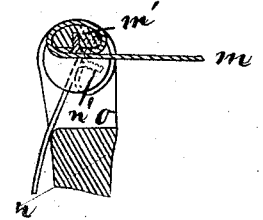

On the accompanying drawings, Figure 1 represents a ground plan of my improved street-sweeping machine. Fig. 2 represents a cross-section on the line A B, shown in Fig. 1. Fig. 3 represents a longitudinal section of the rotary brush, which section is made on the line C D, shown in Fig. 1. Fig. 4 represents an enlarged cross-section on the line E F, shown in Fig. 1. Fig. 5 represents an end view of the brush and support, seen from D, in Fig. 1; and Fig. 6 represents an enlarged cross-section on the line G H, shown in Fig. 2.

Similar letters refer to similar parts wherever they occur on the different parts of the drawings.

$a\ a'\ a''$ represents the frame of the machine. $b\ b'$ are the driving-wheels. $c$ is the driving-shaft provided with the bevel-gear $d$, that engages into a bevel-gear, $e$, on the intermediate shaft $f$, from which a rotary motion is conveyed to the brush-shaft $g$, by means of the endless chain $h$ and suitable chain-pulleys on the intermediate shaft $f$ and brush-shaft $g$, as usual. The brush-shaft $g$ is made of wood, and provided in each end with a short shaft or pin, $i\ i$, that is made to revolve each in a closed bearing, $k\ k'$, as shown in Fig. 3. To the rear of the shaft $a''$ is attached an arm or support, $l$, provided in its outer end with a guide-roller over which the strap or band $m$ is conducted. The extreme lower end of said strap or band $m$ is attached to the bearing $k'$. A similar strap or band, $n$, is attached to the bearing $k$ in the opposite end of the brush-shaft $g$. To the shaft $a'$ is attached a stand or bracket, $o$, through the upper part of which is inserted a movable pin or shaft, $p$, provided with a crank, $q$, as shown. Between the bearings of the stand $o$, the pin or shaft $p$ is made as a pair of cams, $m'\ n'$, each of which is flattened centrally with the axis of the pin $p$, as shown in detail in Fig. 6. The band or strap $m$ is attached to the cam $m'$, and the band or strap $n$ is attached in a similar manner to the cam $n'$, as shown in Fig. 6. By means of the crank $q$, pin $p$, cams $m'\ n'$, and the bands or straps $m\ n$ attached to the bearings $k\ k'$ of the brush-shaft $g$, it will readily be seen that the latter can be raised or lowered at pleasure, simply by turning of the crank $q$, and when the cams $m'\ n'$ are turned to a position as shown in Fig. 6, corresponding to the position of the brush when raised to its highest position, they will remain in such a position on account of the strain of the bands or straps $m\ n$ being in the direction of the center of the pin $p$. By turning the crank $q$ in a direction toward the left, the brush is instantly lowered.

To the driving-shaft $c$ is hinged an arm, $r$, outside of the wheel $b'$, as shown in Fig. 1, in which arm the bearing $k'$ is secured. To the outer end of the movable arm $r$ is attached a stay or brace, $s$, that is hinged in its opposite end $t$ to the shaft or frame-work $a'$, as shown in Fig. 1, by which arrangements great strength is obtained for the support and proper position of the brush-shaft during its operation. The outer end of the frame $a'$ is connected to the outer end of the support $l$ by means of a stationary stay or brace, $u$, as shown in Fig. 1. $v$ represents the dust-guard movable on a stationary shaft or bar, $w$, and is provided with a chain, or its equivalent, $x$, by means of which it can be raised and lowered independent of the position of the brush-shaft, as may be desirable.

The device for detaching the driving-wheels from the driving-shaft is fully shown in Fig.

4, and is arranged as follows: To the shaft $c$ is keyed or attached in each end thereof, a ratchet-wheel, $y$, as shown, the wheels revolve freely on the shaft, and have attached to their hubs or spokes a ring or box, $z$, in which is hinged a pawl, 1, that is kept in contact with the teeth of the ratchet-wheel $y$ by means of a suitable spring, 2, as shown. An eccentric cam, 3, is located in relation to the pawl 1, as shown in said Fig. 4, and its shaft or pin projects through the shell or box $z$, where it can be operated by means of an ordinary wrench or in a similar way. When it is desired to disconnect a driving-wheel from the shaft $c$, all that is needed to do is to turn the eccentric cam 3 about one-half of a revolution, when the pawl 1 is forced from the teeth of the ratchet-wheel $y$, and when in this position the machine can be drawn over the ground without revolving the brush.

Having thus fully described the nature, construction, and operation of my invention, I wish to secure by Letters Patent and claim—

1. The combination of the frame or shafts $a'$ $a''$, with the support $l$ and stay or brace $u$, as and for the purpose described.

2. In combination, with the straps or bands $m$ $n$, the cams or eccentrics $m'$ $n'$, as and for the purpose set forth.

3. The cam or eccentric 3, in combination with the pawl 1, spring 2, ratchet-wheel $y$, the shaft $c$, and the driving-wheel $b$, as and for the purpose set forth.

4. In combination with the rotary brush $g$ 44 of the independently-adjustable dust-guard $v$, as and for the purpose herein set forth and described.

In testimony that I claim the foregoing as my own invention, I have affixed my signature in presence of two witnesses.

JACOB EDSON.

Witnesses:
ALBAN ANDRÉN,
JOHN R. HEARD.